United States Patent
Hanson et al.

(10) Patent No.: US 10,350,810 B2
(45) Date of Patent: Jul. 16, 2019

(54) BARREL ASSEMBLY AND METHOD OF SETTING UP AN EXTRUSION SYSTEM UTILIZING THE BARREL ASSEMBLY

(71) Applicant: Processing Technologies International, LLC, Aurora, IL (US)

(72) Inventors: Dana R. Hanson, St. Charles, IL (US); Mitchell L. Gritzner, Montgomery, IL (US); Ryan E. Leopold, Aurora, IL (US)

(73) Assignee: Processing Technologies international, LLC, Aurora, IL (US)

( * ) Notice: Subject to any disclaimer, the term of this patent is extended or adjusted under 35 U.S.C. 154(b) by 704 days.

(21) Appl. No.: 14/512,943

(22) Filed: Oct. 13, 2014

(65) Prior Publication Data

US 2016/0101556 A1   Apr. 14, 2016

(51) Int. Cl.
| | | |
|---|---|---|
| *B29C 47/20* | (2006.01) | |
| *B29C 48/693* | (2019.01) | |
| *B29C 48/08* | (2019.01) | |
| *B29C 48/25* | (2019.01) | |
| *B29C 48/68* | (2019.01) | |
| *B29L 7/00* | (2006.01) | |

(52) U.S. Cl.
CPC ............ *B29C 48/693* (2019.02); *B29C 48/08* (2019.02); *B29C 48/2565* (2019.02); *B29C 48/2665* (2019.02); *B29C 48/6801* (2019.02); *B29C 2948/00* (2019.02); *B29L 2007/002* (2013.01)

(58) Field of Classification Search
CPC .......................... B29C 47/686; B29C 47/0867
See application file for complete search history.

(56) References Cited

U.S. PATENT DOCUMENTS

| | | | | |
|---|---|---|---|---|
| 3,806,569 A | * | 4/1974 | Gallard | B29C 44/322 264/171.14 |
| 4,615,664 A | * | 10/1986 | Kolossow | B29C 44/3442 264/50 |
| 4,750,841 A | * | 6/1988 | Hicks | B29C 47/08 248/901 |
| 2004/0165796 A1 | * | 8/2004 | Longhurst | F16C 23/02 384/40 |
| 2006/0076705 A1 | * | 4/2006 | Fowler | B29C 47/0004 264/211.23 |
| 2011/0070324 A1 | * | 3/2011 | Padmanabhan | B29C 47/0847 425/192 R |

* cited by examiner

*Primary Examiner* — Galen H Hauth
(74) *Attorney, Agent, or Firm* — Wood, Phillips, Katz, Clark & Mortimer

(57) ABSTRACT

A barrel assembly through which flowable material is delivered to a die assembly through which the flowable material is delivered to form a sheet layer. The barrel assembly has: a conduit having a body with a length defining a lengthwise flow passage between upstream and downstream ends; and a support assembly for the conduit. The support assembly has: a) a conduit engaging assembly; and b) a guide assembly through which the conduit body and conduit engaging assembly are moved guidingly relative to a base, to which the guide assembly is mounted, in a path that is substantially parallel to the length of the conduit body.

24 Claims, 3 Drawing Sheets

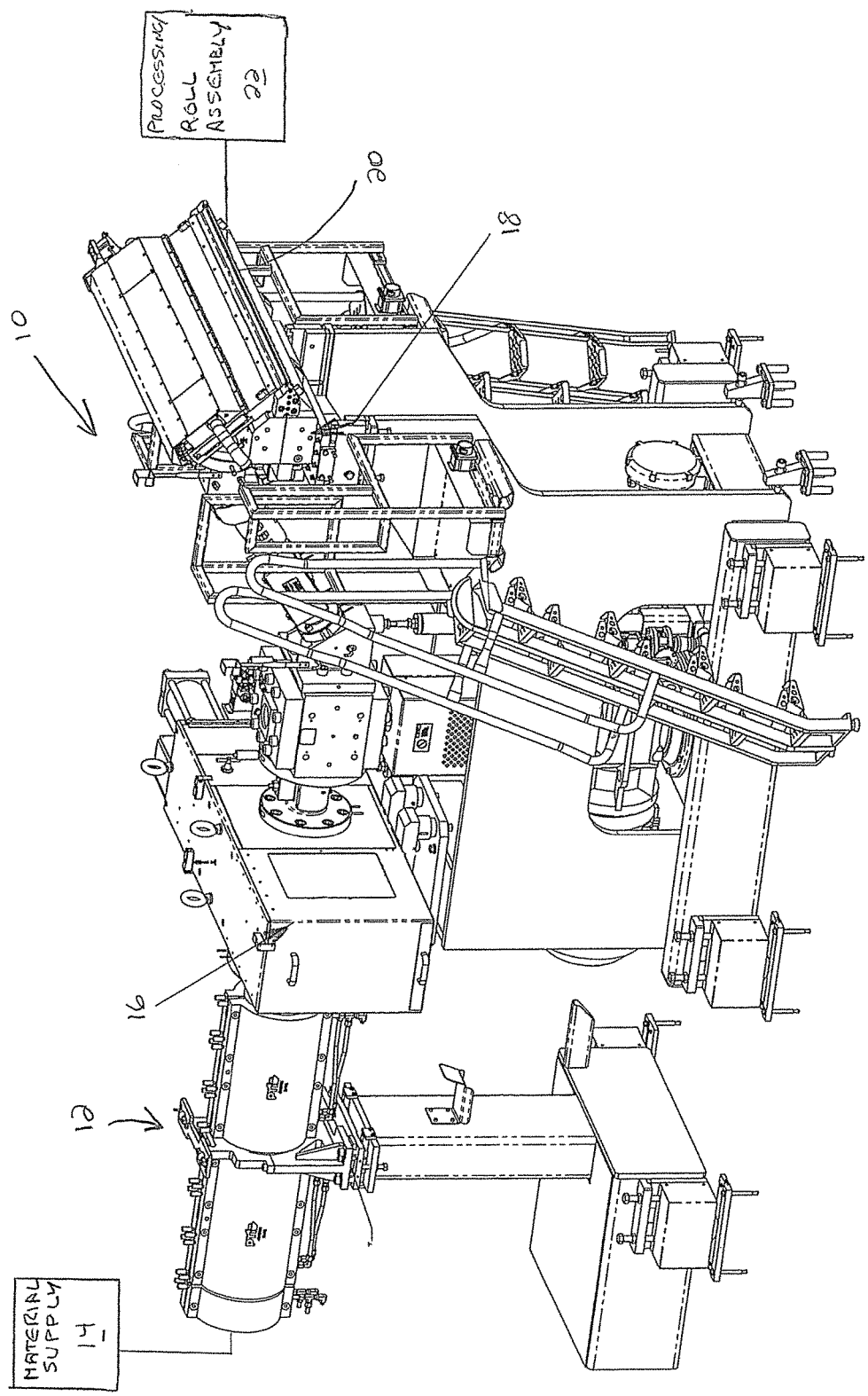

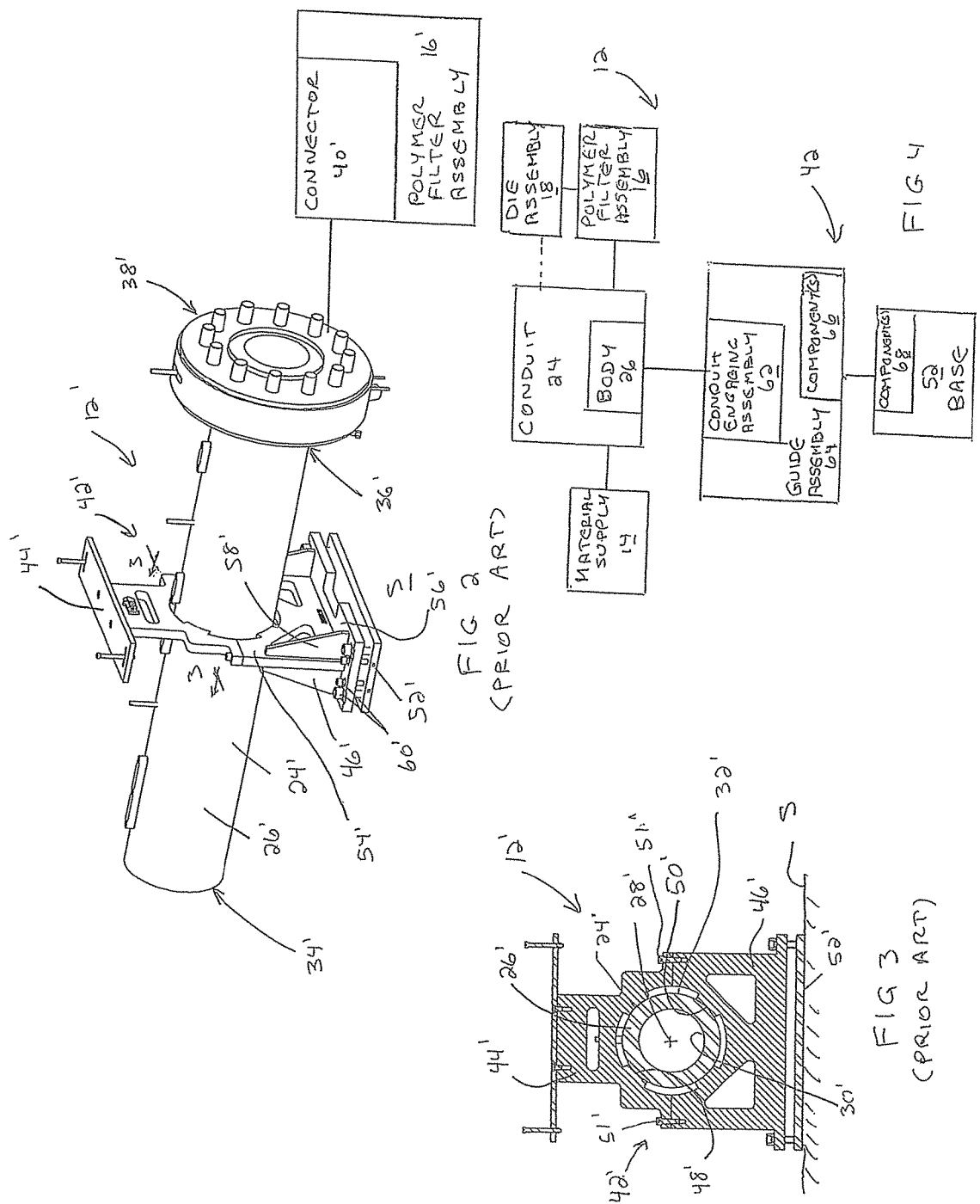

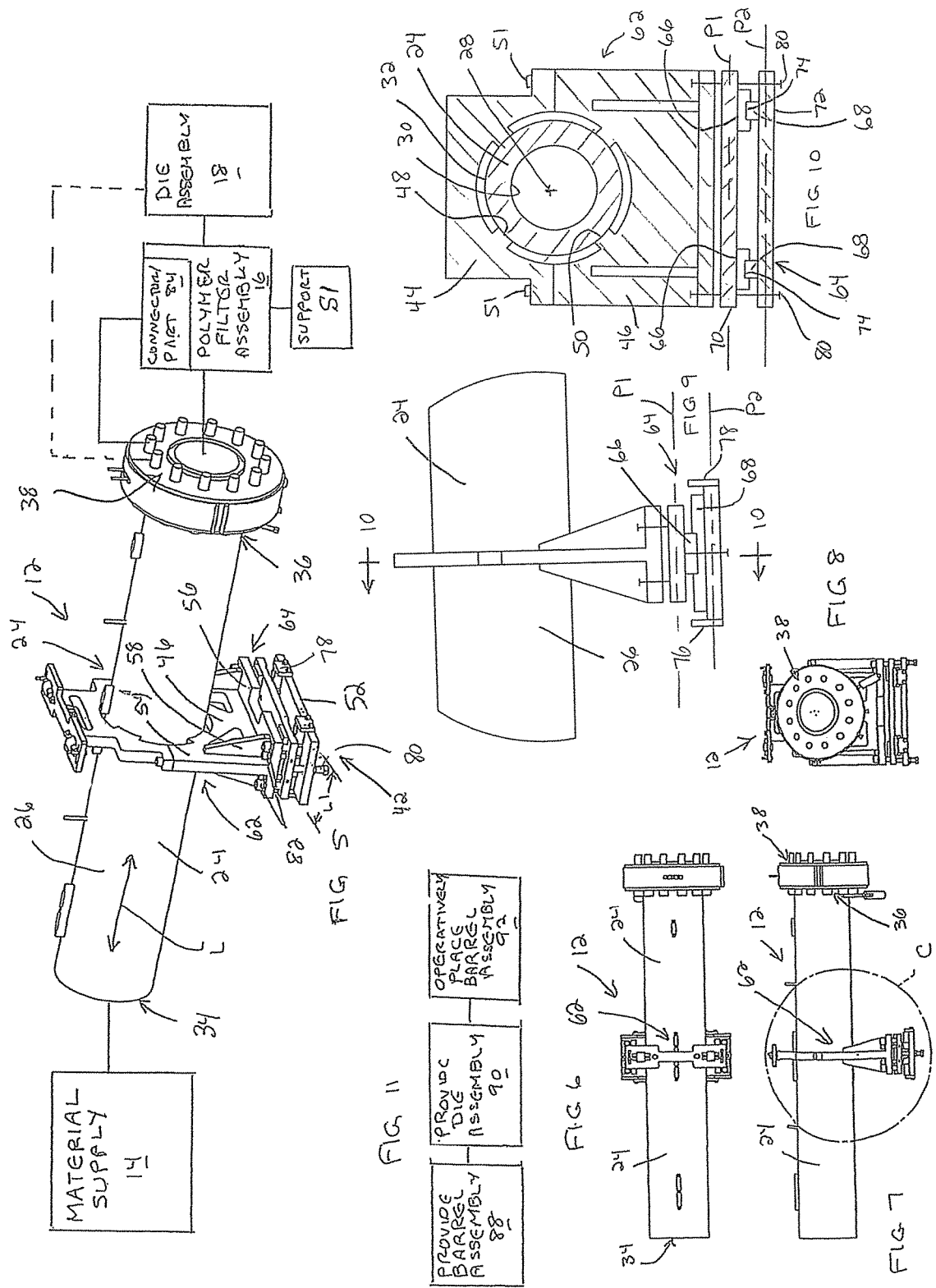

BARREL ASSEMBLY AND METHOD OF SETTING UP AN EXTRUSION SYSTEM UTILIZING THE BARREL ASSEMBLY

BACKGROUND OF THE INVENTION

Field of the Invention

This invention relates to extrusion systems as used to define sheets/sheet products using a supply of flowable material.

Background Art

One basic extrusion sheet forming system utilizes the combination of a barrel assembly, a polymer filter assembly, and a die assembly through which flowable material is delivered from a supply to a processing/roll system through which one or more sheet layers are formed. An exemplary system is shown in U.S. Pat. No. 8,021,140. Flowable material from the supply is delivered through the barrel assembly to the polymer filter assembly, within which filtering of the flowable material takes place. From the polymer filter assembly, the flowable material is directed to the die assembly which causes a precise delivery of the flowable material to a roll system upon which the flowable material is solidified and formed into a sheet that may be accumulated by itself or united with one or more additional sheet layers to produce a completed product or an intermediate product that is further processed downstream, or elsewhere.

Polymer materials utilized in these systems are commonly heated to elevated temperatures that cause expansion of metal parts that must be accommodated to avoid deformation and skewing of system assemblies/components that could compromise the integrity of the sheets and products generated. Various modifications have been made to such systems in the past to minimize deformation and accommodate expansion and contraction of interacting metal parts.

For example, barrel assemblies have utilized metal support components that slide against each other. Alternatively, a "sled-type" of support is utilized wherein the conduit body is clamped into the support and the sled slides metal-to-metal within a guide. Other supports utilize threaded rods that contact the conduit so that the conduit slides over ends of the threaded rods.

None of the above designs has been effective in maintaining component alignment, as when the components reconfigure due to thermal variations or otherwise become altered during operation.

The industry continues to seek designs that better accommodate thermal expansion and contraction in an efficient and practical manner.

SUMMARY OF THE INVENTION

In one form, the invention is directed to a barrel assembly through which flowable material is delivered to a die assembly through which the flowable material is delivered to form a sheet layer. The barrel assembly consists of: a conduit having a body with a length defining a lengthwise flow passage between upstream and downstream ends; and a support assembly for the conduit. The support assembly consists of: a) a conduit engaging assembly; and b) a guide assembly through which the conduit body and conduit engaging assembly are moved guidingly relative to a base, to which the guide assembly is mounted, in a path that is substantially parallel to the length of the conduit body.

In one form, at least a portion of the conduit engaging assembly is fixed to the conduit body to follow lengthwise movement of the conduit body.

In one form, the guide assembly includes at least one rail on one of the conduit engaging assembly and base and a first slot on the other of the conduit engaging assembly and base. The one rail and first slot are configured so that the one rail is guided in the first slot in a substantially first linear path.

In one form, the first linear path is substantially parallel to the length of the body.

In one form, the guide assembly includes another rail and a second slot. The another rail and second slot are provided one each on the conduit engaging assembly and base and configured so that the another rail is guided in the second slot in a substantially second linear path that is substantially parallel to the first linear path.

In one form, the barrel assembly is provided in combination with a die assembly. The conduit body and conduit engaging assembly are guidingly movable through the guide assembly relative to the die assembly.

In one form, the barrel assembly is provided further in combination with a polymer filter assembly through which flowable material is directed in moving between the barrel assembly and the die assembly.

In one form, the conduit body and conduit engaging assembly are guidingly movable through the guide assembly relative to the polymer filter assembly.

In one form, the conduit engaging assembly has first and second parts that captively engage the conduit body.

In one form, the conduit body has a lengthwise axis. The first and second conduit engaging assembly parts cooperatively extend fully around the lengthwise axis of the conduit body.

In one form, the first and second conduit engaging assembly parts are each fixed to the conduit body against movement relative to the body in a lengthwise direction.

In one form, there are parts on the conduit and polymer filter assembly that cooperate to guide relative movement between the conduit and polymer filter assembly in a direction substantially parallel to the length of the conduit body.

In one form, the barrel assembly further includes a first pad on which one of the one rail and first slot is provided and is configured to be selectively movable relative to a part on the conduit engaging assembly to thereby adjust how the one rail is situated in the first slot.

In one form, the part on the conduit engaging assembly consists of a second pad. The first and second pads are defined respectively by first and second flat plates with central planes that are substantially parallel and movable, one relative to the other as the conduit body and conduit engaging assembly are moved through the guide assembly relative to the base.

In one form, one of the pads defines at least a part of the base.

In one form, the guide assembly includes another rail and a second slot. The another rail and second slot are provided one each on the conduit engaging assembly and base and configured so that the another rail is guided in the second slot in a substantially second linear path that is substantially parallel to the first linear path. The one rail and first slot are provided one each on the first and second pads at a first location and the another rail and second slot are provided one each on the first and second pads at a second location.

In one form, the conduit body has a center of gravity and a vertical line through the center of gravity extends between the first and second locations.

In one form, the conduit body has a peripheral outer surface. The first and second parts do not engage the peripheral outer surface fully around the lengthwise axis of the conduit body.

In one form, the conduit body has a lengthwise axis and a body with radially facing inner and outer surfaces that are substantially circular as viewed in cross-section orthogonally to the lengthwise axis.

In one form, the invention is directed to a method of setting up an extruding system. The method includes the steps of: providing a barrel assembly as described above; providing a die assembly through which flowable material is delivered to form a sheet layer; and operatively placing the barrel assembly in relationship to another component so that: a) flowable material can be delivered from the barrel assembly to the die assembly; and b) the conduit body can be moved relative to the another component through the guide assembly in response to thermal expansion and contraction of the conduit body during operation of the extruding system.

BRIEF DESCRIPTION OF THE DRAWINGS

FIG. 1 is a perspective view of an extruding system with a barrel assembly, according to the present invention, utilized therein;

FIG. 2 is a partially schematic, perspective view of a prior art barrel assembly associated with a polymer filter assembly;

FIG. 3 is a cross-sectional view of the barrel assembly taken along line 3-3 of FIG. 2;

FIG. 4 is a schematic representation of an extruding system, as shown in FIG. 1, and incorporating the inventive barrel assembly;

FIG. 5 is a view as in FIG. 2 and showing the inventive barrel assembly;

FIG. 6 is a reduced, plan view of the barrel assembly in FIG. 5;

FIG. 7 is a reduced, side elevation view of the barrel assembly in FIG. 5;

FIG. 8 is a reduced, end elevation view of the barrel assembly in FIG. 5;

FIG. 9 is an enlarged view of the portion of the barrel assembly shown in the circle C in FIG. 7;

FIG. 10 is a cross-sectional view of the barrel assembly taken along line 10-10 of FIG. 9; and FIG. 11 is a flow diagram representation of a method of setting up an extruding system, according to the present invention.

DETAILED DESCRIPTION OF THE PREFERRED EMBODIMENT

In FIG. 1, an extruding system is shown at 10 incorporating a barrel assembly at 12, made according to the present invention. The barrel assembly 12 delivers flowable material, such as a polymer, from a supply 14 thereof to a polymer filter assembly 16 at which the polymer melt is filtered and staged for recycling. The filtered material is delivered from the polymer filter assembly 16 to a die assembly 18. The flowable material exits from the die assembly 18 at a discharge location 20 at which the flowable material is strategically applied upon one or more rolls, generically identified in FIG. 1 as a processing/roll assembly 22.

The nature of the roll assembly 22 and the particular sheet/sheet product formed thereon are not critical to the present invention, as virtually an unlimited number of different designs, for different products and manufacturing processes, are available. The processing/roll assembly 22 may be in the form of a horizontal roll stand, a J-stack arranged roll stand, a vertically arranged roll stand, etc. Sheet formation is described generally in U.S. Pat. No. 8,021,140, the disclosure of which is incorporated herein by reference.

Typically, the barrel assembly 12 and polymer filter assembly 16 are separately formed sub-assemblies that are operatively connected at an extrusion site.

An exemplary prior art barrel assembly is shown at 12' in FIGS. 2 and 3. (The corresponding prior art and inventive components will be designated throughout with the same reference numerals, with the prior art components distinguished with a "'" designation.) The barrel assembly 12' consists of a conduit 24' with a unitary, continuous body 26' having a generally straight, lengthwise extent along a central axis 28'. The body 26' is bounded by radially inwardly and radially outwardly facing surfaces 30', 32', respectively. The body 26' is typically made from a metal composition that will expand and contract through the normal operating temperature range for the flowable material handled thereby.

Given a typical length for the body 26', between upstream and downstream ends 34', 36', respectively, thermal expansion and contraction tends to cause deflection of the conduit body 26' that effectively varies its overall length and may skew an optimal alignment of a connector 38' at the downstream end 36' with a cooperating connector 40' on a cooperating downstream polymer filter assembly 16'.

To reduce the effects of these thermally induced deformations, a support assembly at 42' has been incorporated at approximately a midpoint location between the upstream and downstream ends 34', 36' of the conduit body 26'. The support assembly 42' consists of an upper part 44' and a lower part 46' that are joined to captively engage the outwardly facing surface 32' of the conduit body 26'.

The upper part 44' has an interrupted, radially inwardly facing surface 48' that conforms at least nominally to the curvature of the radially outwardly facing surface 32'. The lower part 46' has a corresponding surface 50'. The upper and lower parts 44', 46' are configured so that when they are drawn together by fasteners/bolts 51', the radially outwardly facing surface 32' is captively squeezed between the surfaces 48', 50' to thereby fix the lengthwise position of the support assembly 42' relative to the conduit body 26'.

The lower part 46' is fixed to a base 52' that may be the subjacent surface S that supports the entire extruding system. Alternatively, the base 52' may be supported indirectly relative to the surface S as by one or more intermediate components that elevate or otherwise strategically orient the barrel assembly 12' relative to the polymer filter assembly 16'. In this embodiment, the lower part 46' is made with a vertically extending flat plate 54' that is fixed to a horizontally extending plate/pad 56'. This connection is rigidified through gussets 58'. The plate/pad 56' is fixedly secured to the base 52' through a series of fasteners 60'.

The support assembly 42' is made with sufficient rigidity that it tends to limit deflection of the conduit body 26' as it is heated to elevated temperatures and cooled throughout processing cycles. At the same time, the support assembly 42' effectively avoids any lengthwise shifting of the conduit body 26′ along the axis 28′, as an incident of which there may be some detrimental misalignment of the connector 38′ with the connector 40′ on the polymer filter assembly 16′ due to thermally induced length variations. However, lengthwise thermal expansion of the rigidly held conduit body 26′ may change a desired relationship between the upstream and/or downstream body ends 34′, 36′ and cooperating components/assemblies. This is one condition that may be addressed by the inventive barrel assembly 12, as described in greater detail hereinbelow.

In FIG. 4, the inventive barrel assembly 12 is shown in schematic form to encompass the specific embodiment therefor described herein, as well as variations that would be apparent to one skilled in this art with the inventive teachings in hand. The invention contemplates substantial variations of the basic components for the barrel assembly 12, as described herein, and their manner of interaction.

As shown in FIG. 4, the conduit 24, through the body 26, delivers flowable material from the supply 14 to the polymer filter assembly 16 from where the flowable material is delivered to the die assembly 18. As depicted in dotted lines, the flowable material might be delivered from the conduit 24 directly to the die assembly 18.

The support assembly 42 for the conduit 24 consists of a conduit engaging assembly 62 and a guide assembly 64 through which the conduit body 26 and conduit engaging assembly 62 are moved guidingly relative to a base 52, to which the guide assembly 64 is mounted.

The guide assembly 64 consists of at least one component 66 associated with the conduit engaging assembly 62 and at least one component 68 associated with the base. The components 66, 68 cooperate to allow the conduit body 26 and conduit engaging assembly 62 to move guidingly relative to the base 52, potentially precisely in a controlled and smooth manner. The components 66, 68 may take virtually an unlimited number of different forms, including those that are currently used for precisely guided translational movement and others that might be devised by one skilled in this art with the inventive teachings in hand. The component configurations described below are exemplary in nature only.

Referring now to FIGS. 1 and 5-10, one preferred form of the barrel assembly 12 is depicted for communicating flowable material from the supply 14 to the polymer filter assembly 16 from where the material is delivered to the die assembly 18. Alternatively, direct delivery of material from the supply 14 to the die assembly 18 is contemplated as shown through the dotted lines in FIG. 5.

The conduit 24 has substantially the same configuration as the conduit 24′, with the body 26 bounded by radially inwardly and outwardly facing, concentric surfaces 30, 32, respectively.

The body 26 has a length indicated by the double-headed arrow L in FIG. 5 that is parallel to the lengthwise axis 28. The body length L extends between an upstream end 34 and a downstream end 36. The radially inwardly facing surface bounds and defines a lengthwise flow passage between the upstream and downstream ends 34, 36.

The support assembly 42 for the conduit 24 consists of the conduit engaging assembly 62 and the guide assembly 64 through which the conduit body 26 and conduit engaging assembly 62 are moved guidingly relative to the base 52, to which the guide assembly 64 is mounted, in a path that is substantially parallel to the length L of the conduit body 26.

At least a portion of, and in this embodiment the entirety of, the conduit engaging assembly 62 is fixed to the conduit body 26 to follow lengthwise movement of the conduit body 26, as may be caused by thermally induced expansion and contraction of the conduit body 26 in a lengthwise direction. The controlled path of movement of the conduit body 26 and conduit engaging assembly 62 relative to the base 52, while shown parallel to the length L of the conduit, may deviate therefrom, depending upon system configuration.

In this embodiment, the conduit engaging assembly 62 is made up of first and second parts 44, 46 which are shown respectively in an upper and lower relationship. The first part 44 has an interrupted, radially inwardly facing surface 48, with the second part 46 having a similar surface 50. The surfaces 48, 50 at least nominally match the curvature of the radially outwardly facing surface 32. The parts 44, 46 are otherwise configured so that when they are drawn together and secured by fasteners/bolts 51, the surfaces 48, 50 captively embrace the outwardly facing surface 32 to fix the joined parts 44, 46 to the conduit body 26 against lengthwise movement relative thereto. The first and second parts 44, 46 cooperatively extend fully around the lengthwise axis 28 of the conduit body 26.

It should be understood that more than the two parts 44, 46 may be used to engage the conduit body 26. Further, a single part might be utilized. Also, virtually any manner of fixing the part(s) to the conduit body 26 might be utilized.

The second part 46 is made from a flat, vertically extending plate 54 which is joined to a flat, horizontally extending plate/pad 56. This connection is reinforced by gussets 58.

To define the guide assembly 64, upper and lower plates/pads 70, 72 are provided. The plates/pads 70, 72 are shown with a flat construction such that they have central planes P1, P2, respectively, that are substantially horizontal and parallel to each other. However, the flat plate construction is not required so long as the guide assembly can be configured to function as described herein. The plate/pad 70 is connected to the part 46 to follow movement thereof. The plate 72 can, for purposes of the description and claims herein, be considered to be part of the base 52 or a component separately attached to the base 52.

The guide assembly 64 includes the components 66, 68 identified in FIG. 4. Within that generic showing is a rail and slot arrangement as depicted in the preferred embodiment. As noted, this construction is only exemplary in nature. In the preferred embodiment, the component 66 defines a slot 74 for a rail 68. The component 66 is fixed to the plate/pad 70, with the component 68 fixed to the plate/pad 72.

In its simplest form, the guide assembly 64 could be made up of a single cooperating pair of the components 66, 68. In this embodiment, two such pairs are shown for greater stability and control.

While the slots 74 are shown formed on the plate/pad 70, the components 66, 68 in one or both of the components pairs might be reversed.

In this embodiment, the component/rail 68 has a length L1 that determines the range of lengthwise movement of the conduit body 26. The component 66 is allowed to slide guidingly along the component/rail 68 between end blocking plates 76, 78. As an alternative arrangement, the slot 74 could have the length L1, with the component/rail 68 having a shorter dimension to move between the lengthwise ends of the slot 74.

As noted, the cooperating components 66, 68 are provided at first and second locations spaced in the direction transversely to the length L of the conduit 24. Each cooperating pair of components 66, 68 guides movement in a linear path, with the linear paths substantially parallel.

A vertical line through the horizontal center of gravity of the barrel assembly 12 resides between the first and second locations and is preferably centered therebetween for stability and precisely controlled movement.

The plates/pads 70, 72 can be permanently fixed to their respective supports. Alternatively, and preferably, at least one of the plates/pads 70, 72 is attached to be capable of being reoriented relative to the other of the plates/pads 70, 72 to change the mating relationship of the components 66, 68, as for purposes of controlling alignment, friction generation, etc.

In this embodiment, adjusting screws 80 are used to change the relationship of the planes P1, P2 for the plates/pads 70, 72 for this purpose. Alternatively, or in conjunction therewith, fasteners 82 between the plate/pad 56 and plate/pad 70 can be used to effect relative positioning of the plates/pads 56, 70, thereby changing the relationship between the planes P1, P2 as necessary or desired.

As noted, while the slot and rail arrangement has been described for the components 66, 68, the generic showing thereof is intended to encompass virtually any other type of guide arrangement that one skilled in the art would develop with the inventive teachings in hand. For example, linear bearings, captured cam followers, captured wheeled arrangements, etc. are contemplated including, but not limited to, the arrangements shown in U.S. Pat. No. 8,021,140. Low friction guided movement is a design objective, regardless of the particular construction. A further objective is to stabilize the conduit horizontally in a direction transverse to the conduit length.

With the system configuration as shown in FIG. 1, the conduit body 26 and conduit engaging assembly 62 are movable through the guide assembly 64 relative to each of the polymer filter assembly 16 and die assembly 18 in a direction substantially parallel to the length of the conduit body 26. The components 66, 68 at the same time reinforce the conduit body 26 against lateral deflection.

In the case of the polymer filter assembly 16, there are parts on the conduit 24 and polymer filter assembly 16 that cooperate to guide relative movement between these components. More specifically, as shown in FIG. 5, the conduit 24 has a connector 38 that is configured to cooperate with a connector/part 84 on the polymer filter assembly 16 to allow this interaction.

The polymer filter assembly 16 is in turn operatively positioned through a support S1. The schematic showing of the support S1 is intended to encompass configurations wherein the polymer filter assembly 16 is either fixed or movable guidingly in a lengthwise direction relative to the conduit 24. The support S1 may also be configured to biasably support the polymer filter assembly so that it "floats" vertically, or is at least vertically biased, to facilitate vertical alignment with the conduit 24.

Accordingly, as the extruding system 10 is operated, the lengthwise dimensional variation of the conduit 24 is accommodated by allowing the conduit 24 to translate lengthwise in a guided manner. While the barrel assembly 12 is shown in a horizontal orientation, the inventive structure would be equally effective with the lengthwise axis 28 of the conduit 24 angled with respect to horizontal.

Similar connections may be used between the upstream conduit end 34 and any assembly from which the flowable material is delivered to maintain proper alignment and connection between these components during operation.

The support assembly 42 provides vertical and horizontal out-of-plane support such that the conduit 24 is stiffened within individual and multiple support positions.

Precision alignment can be sensed via lasers and/or optics with appropriate adjustments made, if necessary, to correct for any measured mis-alignments.

With the barrel assembly 12, as described above, the extruding system 10 can be set up by practicing a method as shown in flow diagram form in FIG. 11. As shown at block 88, a barrel assembly as described above is provided. As shown at block 90, the die assembly, as described above, is provided through which flowable material is delivered to form a sheet layer. As shown at block 92, the barrel assembly is operatively placed in relationship to another component so that: a) flowable material can be delivered from the barrel assembly to the die assembly; and b) the conduit body can be moved relative to the other component through the guide assembly in response to thermal expansion and contraction of the conduit body during operation of the extruding system.

The foregoing disclosure of specific embodiments is intended to be illustrative of the broad concepts comprehended by the invention.

The invention claimed is:

1. A barrel assembly through which flowable material is delivered to a die assembly through which the flowable material is delivered to form a sheet layer, the barrel assembly comprising:
   a conduit having a unitary, continuous body with a length defining a lengthwise flow passage between upstream and downstream ends; and
   a support assembly for the conduit, the support assembly comprising:
   a) a conduit engaging assembly; and
   b) a guide assembly directly beneath the conduit body through which the conduit body and conduit engaging assembly are moved guidingly relative to a base, to which the guide assembly is mounted, consistently in a predetermined substantially linear first path that is substantially parallel to the length of the conduit body, as an incident of the length of the conduit body changing due to thermal expansion or contraction,
   wherein at least a portion of the conduit engaging assembly is fixed to the conduit body, at approximately a midpoint location between the upstream and downstream ends, to follow lengthwise movement of the conduit body.

2. The barrel assembly according to claim 1 wherein the guide assembly comprises at least one rail on one of the conduit engaging assembly and base and a first slot on the other of the conduit engaging assembly and base, the one rail and first slot configured so that the one rail is guided in the first slot in the substantially linear first path.

3. The barrel assembly according to claim 2 wherein the guide assembly comprises another rail and a second slot, the one rail and the another rail each projecting vertically at spaced locations, the another rail and second slot provided one each on the conduit engaging assembly and base and configured so that the another rail is guided in the second slot in a second substantially linear path that is substantially parallel to the substantially linear first path.

4. The barrel assembly according to claim 1 in combination with the die assembly wherein the conduit body and conduit engaging assembly are guidingly movable through the guide assembly relative to the die assembly.

5. The barrel assembly according to claim 4 further in combination with a polymer filter assembly through which flowable material is directed in moving between the barrel assembly and the die assembly, the polymer filter assembly connected to the downstream end of the conduit body.

6. The barrel assembly according to claim 5 wherein the conduit body and conduit engaging assembly are guidingly movable through the guide assembly relative to the polymer filter assembly.

7. The barrel assembly according to claim 1 wherein the conduit engaging assembly comprises first and second parts that captively engage the conduit body.

8. The barrel assembly according to claim 7 wherein the conduit body has a lengthwise axis and the first and second conduit engaging assembly parts cooperatively extend fully around the lengthwise axis of the conduit body.

9. The barrel assembly according to claim 7 wherein the first and second conduit engaging assembly parts are each fixed to the conduit body against movement relative to the body in a lengthwise direction.

10. The barrel assembly according to claim 6 wherein there are parts on the conduit and polymer filter assembly that cooperate to guide relative movement between the conduit and polymer filter assembly in a direction substantially parallel to the length of the conduit body.

11. A barrel assembly through which flowable material is delivered to a die assembly through which the flowable material is delivered to form a sheet layer, the barrel assembly comprising:
a conduit having a body with a length defining a lengthwise flow passage between upstream and downstream ends; and
a support assembly for the conduit, the support assembly comprising:
a) a conduit engaging assembly; and
b) a guide assembly directly beneath the conduit body through which the conduit body and conduit engaging assembly are moved guidingly relative to a base, to which the guide assembly is mounted, consistently in a predetermined substantially linear first path that is substantially parallel to the length of the conduit body, as an incident of the length of the conduit body changing due to thermal expansion or contraction,
wherein at least a portion of the conduit engaging assembly is fixed to the conduit body, at approximately a midpoint location between the upstream and downstream ends, to follow lengthwise movement of the conduit body,
wherein the guide assembly comprises at least one rail on one of the conduit engaging assembly and base and a first slot on the other of the conduit engaging assembly and base, the one rail and first slot configured so that the one rail is guided in the first slot in the substantially linear first path,
wherein the barrel assembly further comprises a first pad on which one of the one rail and first slot is provided in a fixed relationship with respect to the first pad and is configured to be selectively movable relative to a part on the conduit engaging assembly to thereby adjust how the one rail is situated in the first slot.

12. A barrel assembly through which flowable material is delivered to a die assembly through which the flowable material is delivered to form a sheet layer, the barrel assembly comprising:
a conduit having a body with a length defining a lengthwise flow passage between upstream and downstream ends; and
a support assembly for the conduit, the support assembly comprising:
a) a conduit engaging assembly; and
b) a guide assembly directly beneath the conduit body through which the conduit body and conduit engaging assembly are moved guidingly relative to a base, to which the guide assembly is mounted, consistently in a predetermined substantially linear first path that is substantially parallel to the length of the conduit body, as an incident of the length of the conduit body changing due to thermal expansion or contraction,
wherein at least a portion of the conduit engaging assembly is fixed to the conduit body, between the upstream and downstream ends, to follow lengthwise movement of the conduit body,
wherein the guide assembly comprises at least one rail on one of the conduit engaging assembly and base and a first slot on the other of the conduit engaging assembly and base, the one rail and first slot configured so that the one rail is guided in the first slot in the substantially linear first path,
wherein the barrel assembly further comprises a first pad on which one of the one rail and first slot is provided and is configured to be selectively movable relative to a part on the conduit engaging assembly to thereby adjust how the one rail is situated in the first slot,
wherein the part on the conduit engaging assembly comprises a second pad, the first and second pads defined respectively by first and second flat plates with central planes that are substantially parallel and movable, one relative to the other as the conduit body and conduit engaging assembly are moved through the guide assembly relative to the base.

13. The barrel assembly according to claim 12 wherein one of the pads defines at least a part of the base.

14. The barrel assembly according to claim 12 wherein the guide assembly comprises another rail and a second slot, the another rail and second slot provided one each on the conduit engaging assembly and base and configured so that the another rail is guided in the second slot in a second substantially linear path that is substantially parallel to the first substantially linear path, wherein the one rail and first slot are provided one each on the first and second pads at a first location and the another rail and second slot are provided one each on the first and second pads at a second location.

15. The barrel assembly according to claim 14 wherein the conduit body has a center of gravity and a vertical line through the center of gravity extends between the first and second locations.

16. The barrel assembly according to claim 8 wherein the conduit body has a peripheral outer surface and the first and second parts do not engage the peripheral outer surface fully around the lengthwise axis of the conduit body.

17. The barrel assembly according to claim 1 wherein the conduit body has a lengthwise axis and a body with radially facing inner and outer surfaces that are substantially circular as viewed in cross-section orthogonally to the lengthwise axis.

18. A method of setting up an extruding system, the method comprising the steps of:
providing a barrel assembly as recited in claim 1;
providing a die assembly through which flowable material is delivered to form a sheet layer; and
operatively placing the barrel assembly in relationship to another component so that: a) flowable material can be delivered from the barrel assembly to the die assembly; and b) the conduit body can be moved relative to the another component through the guide assembly in response to thermal expansion and contraction of the conduit body during operation of the extruding system.

19. A barrel assembly through which flowable material is delivered to a die assembly through which the flowable material is delivered to form a sheet layer, the barrel assembly comprising:
   a conduit having a body with a length defining a lengthwise flow passage between upstream and downstream ends; and
   a support assembly for the conduit, the support assembly comprising:
   a) a conduit engaging assembly; and
   b) a guide assembly through which the conduit body and conduit engaging assembly are moved guidingly relative to a base, to which the guide assembly is mounted, in a path that is substantially parallel to the length of the conduit body,
      wherein the guide assembly comprises at least one rail on one of the conduit engaging assembly and base and a first slot on the other of the conduit engaging assembly and base, the one rail and first slot configured so that the one rail is guided in the first slot in a first substantially linear path,
      wherein the barrel assembly further comprises a first pad on which one of the one rail and first slot is provided in a fixed relationship with the first pad and is configured to be selectively movable relative to a part on the conduit engaging assembly to thereby adjust how the one rail is situated in the first slot.

20. The barrel assembly according to claim 1 wherein the conduit body has a lengthwise central axis and the guide assembly is configured to block movement of the conduit body relative to the base around the lengthwise central axis of the conduit body.

21. The barrel assembly according to claim 3 wherein the first and second rails are separate, independent elements.

22. The barrel assembly according to claim 1 wherein the guide assembly is configured so that the conduit body and conduit engaging assembly are blocked to be confined in movement within a fixed range along the first path.

23. A barrel assembly through which flowable material is delivered to a die assembly through which the flowable material is delivered to form a sheet layer, the barrel assembly comprising:
   a conduit having a body with a length defining a lengthwise flow passage between upstream and downstream ends; and
   a support assembly for the conduit, the support assembly comprising:
   a) a conduit engaging assembly; and
   b) a guide assembly through which the conduit body and conduit engaging assembly are moved guidingly relative to a base, to which the guide assembly is mounted, in a path that is substantially parallel to the length of the conduit body,
      wherein the guide assembly comprises at least one component on one of the conduit engaging assembly and base and a cooperating component on the other of the conduit engaging assembly and base, the one and cooperating components configured to move relative to each other while maintaining a first relationship to guide the conduit body and conduit engaging assembly,
      wherein the guide assembly is configured so that a relationship between the one and cooperating components can be selectively changed from the first relationship into a second relationship in which the one and cooperating components guide the conduit body and conduit engaging assembly in the path by changing a relationship between a component that supports one of the one and cooperating components and the other of the one and cooperating components.

24. A barrel assembly through which flowable material is delivered to a die assembly through which the flowable material is delivered to form a sheet layer, the barrel assembly comprising:
   a conduit having a body with a length defining a lengthwise flow passage between upstream and downstream ends;
   a support assembly for the conduit, the support assembly comprising:
   a) a conduit engaging assembly;
   b) a guide assembly directly beneath the conduit body through which the conduit body and conduit engaging assembly are moved guidingly relative to a base, to which the guide assembly is mounted, consistently in a predetermined substantially linear first path that is substantially parallel to the length of the conduit body, as an incident of the length of the conduit body changing due to thermal expansion or contraction,
   wherein at least a portion of the conduit engaging assembly is fixed to the conduit body, at approximately a midpoint location between the upstream and downstream ends, to follow lengthwise movement of the conduit body,
   wherein the guide assembly comprises at least one rail on one of the conduit engaging assembly and base and a first slot on the other of the conduit engaging assembly and base, the one rail and first slot configured so that the one rail is guided in the first slot in the substantially linear first path,
   wherein the guide assembly comprises another rail and a second slot, the one rail and the another rail each projecting vertically at spaced locations, the another rail and second slot provided one each on the conduit engaging assembly and base and configured so that the another rail is guided in the second slot in a second substantially linear path that is substantially parallel to the substantially linear first path; and
   a first pad that supports two of the one rail, the another rail, the first slot, and the second slot, the first pad configured to be movable together with the two of the one rail, the another rail, the first slot, and the second slot relative to a part on the conduit engaging assembly to thereby change how the one and another rail are situated in the first and second slots.

* * * * *